Figure 1:
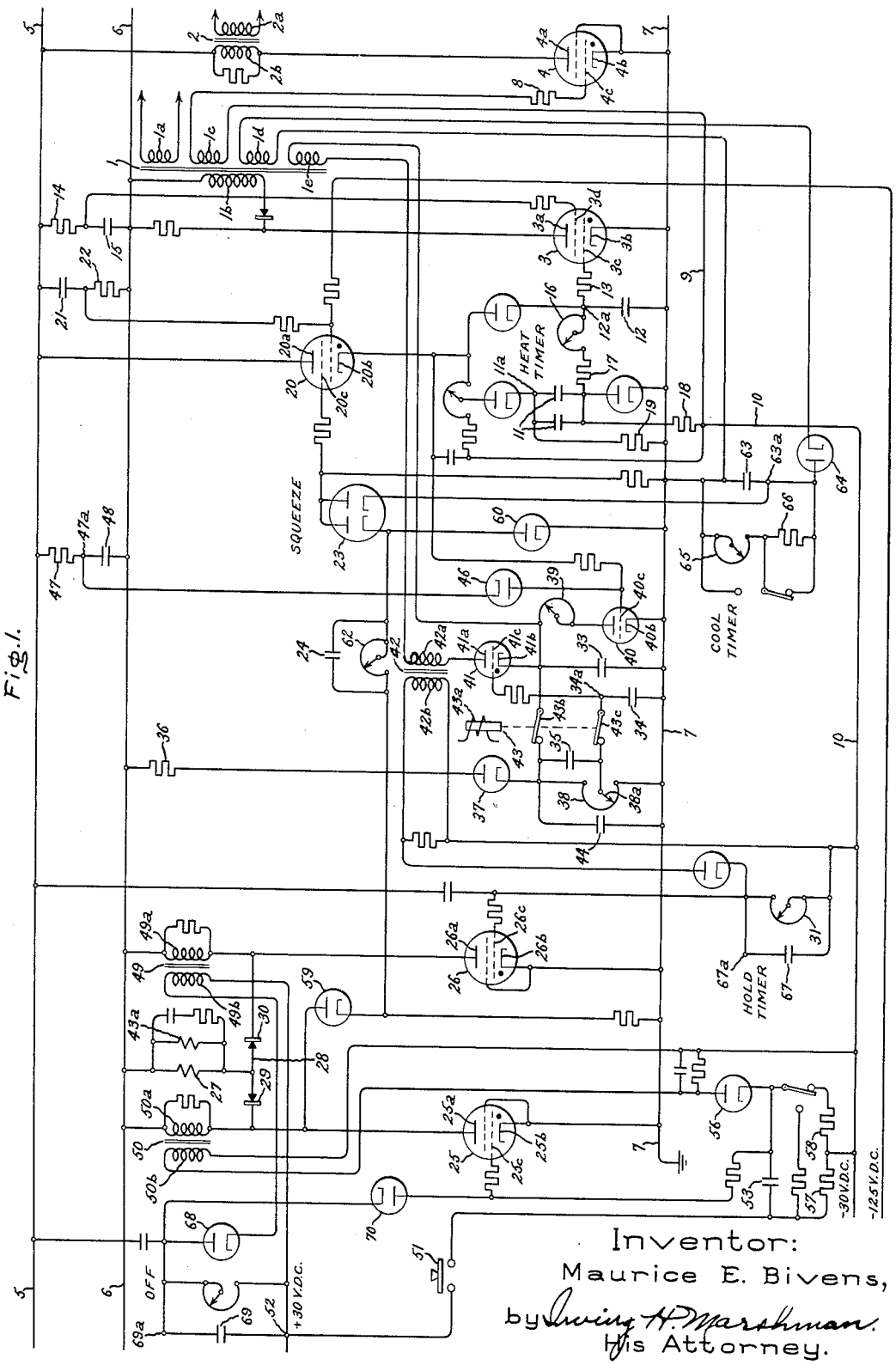

March 27, 1956  M. E. BIVENS  2,740,045
IMPULSE COUNTING CIRCUIT
Filed Sept. 29, 1954  2 Sheets-Sheet 2
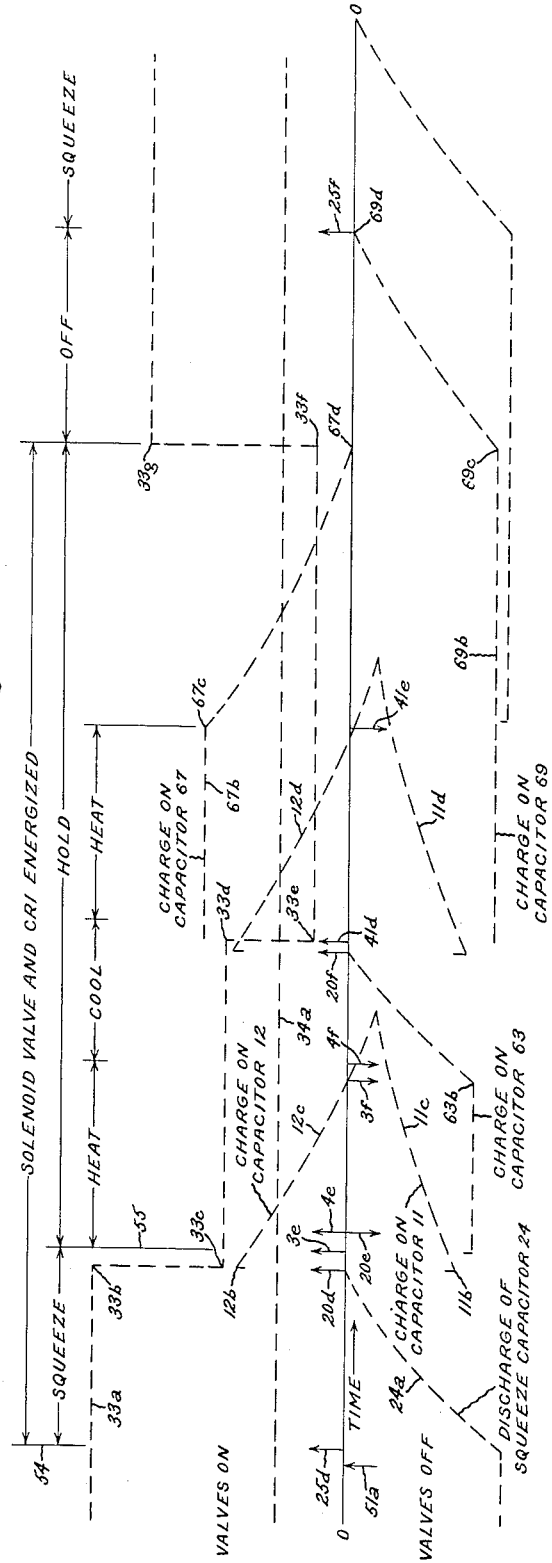
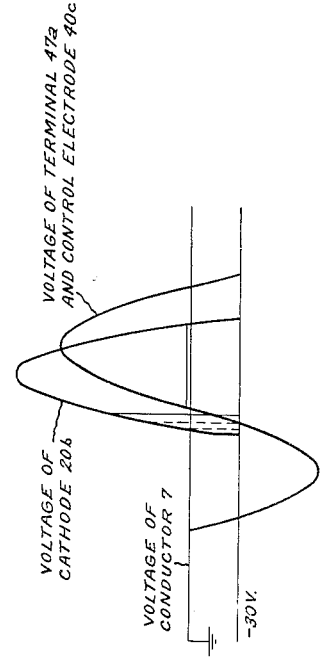
Inventor:
Maurice E. Bivens,
by Irving H. Marshman
His Attorney.

United States Patent Office 2,740,045
Patented Mar. 27, 1956

2,740,045

IMPULSE COUNTING CIRCUIT

Maurice E. Bivens, Schenectady, N. Y., assignor to General Electric Company, a corporation of New York Application September 29, 1954, Serial No. 459,120

10 Claims. (Cl. 250—27)

This invention relates to counting circuits, more particularly to impulse counting circuits for use in control systems, and it has for an object the provision of an improved counting circuit of this character. More specifically, the invention relates to a circuit for counting electrical voltage impulses and for responding to a predetermined number of such impulses to initiate a control operation.

One example of a control system in which a counting circuit of this character has utility is a resistance spot welding system. In such a system, each of the spot welds is formed by a number of timed applications of welding current, known as "heat periods," which are separated from each other by intervening "cool periods." In order that structurally sound and commercially satisfactory welds may be formed, it is essential that each spot weld be formed by a precise number of applications of welding current which number has been predetermined to produce welds of the best quality. Devices for counting the heat periods have previously been used. In general counting circuits used heretofore have been complicated and costly and subject to inaccurate counting in response to changes in the magnitude of the voltage of the source from which the counting circuit is supplied. Accordingly, a more specific object of this invention is the provision of an electrical impulse counting circuit which is simple and inexpensive and thoroughly reliable in operation.

In carrying the invention into effect in one form thereof, there is provided a pair of capacitors together with means for charging them to substantially different voltages having a predetermined ratio. To the terminals of one of these capacitors is connected the output circuit of an electric valve to the input circuit of which is supplied a succession of voltage impulses of substantially equal duration for rendering the valve conducting so as to remove from such capacitor in response to each such impulse a predetermined portion of its charge. Upon the occurrence of the last of a predetermined number of such impulses the voltages of the two capacitors attain a predetermined relationship. For initiating a control operation in response to such last impulse of the succession, there is provided a second electric valve of which the cathode and control electrode are connected to corresponding terminals of the two capacitors to effect response of the valve to such predetermined voltage relationship to activate a control circuit. To provide for varying over a wide range the number of impulses required to establish this capacitor voltage relationship to which the counting circuit responds, an adjustable rheostat is included in the output circuit of the first valve to control the amount of charge removed from the capacitor in response to each voltage impulse.

For a better and more complete understanding of the invention, reference should now be had to the following specification and to the accompanying drawings of which Fig. 1 is a simple diagrammatical sketch of an embodiment of the invention in a resistance spot welding control system and Figs. 2 and 3 are charts of characteristic curves and legends which facilitate an understanding of the operation of the counting circuit and particularly its operation in the resistance welding control system in which it is embodied in Fig. 1.

Referring now to Fig. 1 of the drawing, which is a schematic diagram of a resistance spot welding control system, the two windings 1a and 2a may be considered to be the secondary winding of two control transformers 1 and 2 respectively, which are utilized to supply timed voltage impulses to the firing circuits of a pair of ignitron electric valves (not shown) which, through a welding transformer (not shown) supply welding current to the welding electrodes (also not shown) of a resistance welding machine. The primary windings 1b and 2b of these transformers are connected in the anode circuits of two timing circuit electric valves 3 and 4 respectively, which are preferably thyratron valves. These valves are respectively provided with anodes 3a and 4a, cathodes 3b and 4b, and control electrodes 3c and 4c respectively. They are interconnected to provide for trailing operation of valve 4 with respect to valve 3, i. e. the valve 3 will fire during the positive half cycle of the alternating supply voltage and the valve 4 will fire during the next succeeding or negative half cycle of the supply voltage in which the voltage supplied to its own anode is positive. To provide this mode of operation, alternating voltages which are displaced from each other 180° are supplied to the anodes 3a and 4a from alternating voltage supply conductors 5 and 6 which may be considered to be the secondary terminals of a supply transformer which is not shown. To the grounded conductor 7 which may be considered to be the center tap of such supply transformer secondary winding, the cathodes 3b and 4b are connected. The main control electrode 4c of trailing timing valve 4 is connected through resistor 8, secondary winding 1c of transformer 1, and conductor 9 to a direct voltage supply terminal 10 which may be considered to have a voltage which is negative with respect to ground by a predetermined amount, such for example as 30 volts. Thus valve 4 is maintained normally non-conducting by the negative voltage which is supplied to its control electrode. However, when leading timing valve 3 conducts, the transformer 1 is energized and a turn-on voltage is induced in the secondary winding 1c which overcomes the negative bias and renders valve 4 conducting. Thus, when valve 3 becomes conducting during the positive half cycle of its anode voltage, which is assumed to be the positive half cycle of the supply voltage, the timing valve 4 becomes conducting during the next or negative half cycle of the supply voltage, when positive voltage is supplied to its own anode 4a. Consequently valve 4 will always operate in trailing response to valve 3 and is therefore referred to as the trailing timing valve.

For controlling the period of conduction of valve 3, a double capacitor timing circuit is provided which comprises the two capacitors 11 and 12. Preferably capacitor 11 has substantially greater capacity than capacitor 12. This is indicated in the drawing by illustrating capacitor 11 as two separate capacitors. Since this double capacitor timing circuit controls the time during which timing valve 3 and 4 conduct, it also times the period during which the main ignitron valves (not shown) supply welding current to the welding transformer. It is therefore referred to as the weld "heat" timer, or simply the heat timer. This timing circuit embodies certain broad aspects of a double capacitor timing circuit which is disclosed and claimed in application S. N. 311,503— M. E. Bivens, filed September 25, 1952, and assigned to the assignee of the present invention.

The capacitor 12 is connected across the cathode 3b and control electrode 3c of leading timing valve 3 through current limiting resistor 13. A second control electrode 3d of leading timing valve 3 is connected to the common terminal of a resistor 14 and a capacitor 15, which are connected in series relationship across the supply conductors 5 and 6 to provide a static phaseshift circuit. This phase-shift circuit is adjusted to provide an alternating voltage on the auxiliary control electrode 3d which permits valve 3 to become conducting only during the early part of the positive half cycle of its anode voltage e. g. the first 30 degrees.

With the supply conductors 5 and 6 energized, timing capacitors 11 and 12 are charged by the voltage across the conductors 7 and 10. The charging circuit for capacitor 12 is traced from grounded conductor 7 through adjustable timing resistor 16, fixed resistors 17 and 18 to the negative terminal 10. As a result of this connection capacitor 12 is charged positive at its lower terminal and negative at its terminal 12a to which the control electrode 3c is connected. These timing capacitors 11 and 12 are connected in a local discharge timing circuit with adjustable resistor 16 and fixed resistors 17 and 19. Adjustable resistor 16 is very much larger than resistors 17 and 19, and consequently its adjustment is dominant in determining the time constant of the timing circuit. During standby, the capacitors 11 and 12 are charged so that their voltages will oppose each other in the local timing circuit, with the negative terminal of capacitor 12 connected to control electrode 3c to maintain timing valve 3 non-conducting.

Action of the heat timer is started by an initiating valve 20 which is preferably a thyratron provided with an anode 20a, a cathode 20b, a main control electrode 20c and an auxiliary control electrode. The auxiliary control electrode is connected to an intermediate point of a static phase-shift circuit which comprises capacitor 21 and a resistor 22 connected in series relationship across supply conductors 5 and 6. Such is the phase of the voltage which is supplied from this static phase-shift circuit to the auxiliary control electrode that the valve 20 can begin conducting only in the early portion of the positive half cycle of its anode voltage, and such conduction is subject of course to the control imposed by the main control electrode 20c.

In order normally to maintain initiating valve 20 non-conducting, it is biased below cutoff by means of connection of its control electrode 20c through diode valve 23 to the negative terminal of the "squeeze" time capacitor 24 which is connected in a charging circuit that extends from supply conductor 6 to grounded conductor 7. In the welding cycle, the "squeeze" time is the period following initiation of the welding cycle and preceding the first application of welding current during which the electrodes are moved into engagement with and held in firm contact with the work to be welded. As a result of the foregoing connection, when the anode voltage of valve 20 is positive, the voltage supplied from supply conductor 6 to the control electrode 20c is negative. The squeeze time capacitor 24 which was charged in the previous half cycle adds the negative bias voltage to insure maintaining valve 20 below cutoff.

An electric valve 25 is instrumental in initiating the entire welding operation sequence, and is consequently referred to as the sequence initiating valve. It is preferably a thyratron and has its anode 25a connected through the primary winding of a control transformer to the supply conductor 6, and its cathode 25b connected to the grounded conductor 7. It is provided with a main control electrode 25c which is normally connected to terminal 10 of the control voltage source, which is 30 volts negative with respect to ground, so that valve 25 is normally biased below cutoff.

Another valve 26 which is preferably a thyratron, is provided to exercise certain control over the solenoid valve which controls the admission of pressure fluid to a cylinder which acts to squeeze the welding electrodes together during the welding operation. The actuating solenoid 27 of this solenoid valve is connected between supply conductor 6 and a section of a conductor 28 between two oppositely poled surface contact dry type rectifiers 29 and 30. The valve 26 is provided with an anode 26a, and a cathode 26b, and a control electrode 26c. The anode 26a is connected through rectifier 30 to the section of the sectionalized conductor to which the valve operating solenoid 27 is connected, and the cathode 26b is connected to the grounded conductor 7. Normally, the valve 26 is biased below cutoff by means of a connection from its control electrode through adjustable resistor 31 to the terminal 10 of which the voltage is 30 volts negative with respect to ground.

For the purpose of determining the number of distinct applications of welding current to be employed in forming a spot weld, an electric impulse counting circuit is provided. It comprises a plurality of capacitors 33, 34 and 35. As shown, corresponding terminals of capacitors 33 and 34 are connected together and also to the grounded conductor 7. A charging circuit for all three capacitors is completed from the alternating voltage supply conductor 6 through a resistor 36 and a diode rectifier valve 37 to the positive terminal of the capacitors. Although illustrated as a thermionic type diode valve, the rectifier 37 may be of any suitable type.

Included in the connection between the cathode of valve 37 and conductor 7 and in parallel with capacitor 33 is an adjustable calibrating rheostat 38. It has a sliding contact 38a to which is connected the positive terminal of capacitor 34 and the negative terminal of capacitor 35 whose positive terminal is connected to the cathode of valve 37. As a result of the foregoing connections, the full voltage across rheostat 38 is applied to capacitor 33 whereas there is applied to charge capacitor 35 and 34 respectively, the voltages between the slider 38a and the external positive and negative terminals of the rheostat.

Capacitor 34 is charged to approximately one-third the voltage of capacitor 33 and capacitor 35 is charged to two-thirds the voltage of the capacitor 33. The relative voltages of capacitors 33, 34 and 35 is determined by adjustment of the slider 38a.

In parallel with capacitor 33 is connected a discharge circuit which includes in series relationship a rheostat 39 and the output circuit of an electric valve 40 of which the input circuit is connected to the output circuit of timing initiating valve 20. As shown, the cathode 40b of valve 40 is connected to the grounded conductor 7 and the control electrode 40c is connected to the cathode of valve 20.

Each time that valve 20 becomes conducting to initiate a heat time a positive voltage impulse is supplied to the control electrode 40c which renders valve 40 conducting to remove a predetermined portion of the charge from capacitor 33. After a predetermined number of conductions of valve 40 and a corresponding number of removals of such predetermined portions of charge from capacitor 33, a predetermined relationship will exist between the voltage of capacitor 34 and the voltage remaining on capacitor 33. For example after such predetermined number of conductions of valve 40 the voltage of capacitor 33 may be approximately equal to the voltage of capacitor 34.

For responding to such predetermined relationship of voltages of capacitors 33 and 34 to initiate a control operation there is provided an electric valve 41 which is preferably a thyratron. It is provided with an anode 41a, cathode 41b which is connected to the positive terminal of capacitor 33 and a control electrode 41c which is connected to the positive terminal of capacitor 34. The anode-cathode conducting path of valve 41 is connected in a control circuit in which is also included the primary winding 42a of a control transformer 42 and the secondary winding 1e of the firing circuit transformer 1 which acts as a source of supply for valve 41. Since, in the fully charged state of capacitors 33 and 34 the voltage of capacitor 33 is approximately 3 times the voltage of capacitor 34, the voltage of cathode 41b is overwhelmingly positive with respect to the voltage of a control electrode 41c and the valve 41 is therefore maintained non-conducting.

When a predetermined number of voltage impulses supplied by valve 20 have caused valve 40 to remove in a series of successive steps a predetermined portion of the charge from capacitor 33, the voltage of cathode 41b becomes equal to that of control electrode 41c and valve 41 is rendered conducting to initiate a control operation. Thus capacitors 33 and 34, are connected in a voltage comparison circuit in which the voltage of capacitor 34 serves as a reference voltage with which is compared voltage of capacitor 33 and consequently capacitor 34 is referred to as the reference voltage capacitor, and capacitor 33 is referred to as the counting voltage capacitor.

The adjustable rheostat 39 may be adjusted to provide any number between one and a maximum number e. g. 15 of applications welding current per single spot weld. Likewise, the heat timer and cool timer may be set to provide heat periods and intervening cool periods of which the duration may be any number of cycles between a fraction of a single cycle and a maximum such, for example, as 30 complete cycles. Thus during the operation of counting heat periods, reference voltage capacitor 34 must substantially maintain its initial voltage. Consequently its capacitance must be chosen sufficiently large to minimize the effect of leakage resistance. Likewise capacitor 33 must have a high leakage resistance.

For disconnecting capacitors 33 and 34 from the charging source immediately prior to initiation of a counting operation, a switching device 43 is provided which is illustrated as comprising an electromagnetic relay having an operating coil 43a connected in the anode circuit of sequence initiating valve 25 and normally closed contacts 43b and 43c in the charging connections to capacitors 33 and 34. In this connection, the coil 43a is shown twice; once in its physical association with contacts 43b and 43c and a second time in its correct position in the anode circuit of valve 25.

Accurate counting operation of the counting circuit is dependent on accurately presetting and maintaining until the counting operation is initiated a predetermined relationship between the reference voltage and the counting voltage. Owing to the presence of a portion of rheostat 38 in the charging circuit of capacitor 34 (if capacitor 35 were not provided) its time constant would be different from that of the charging circuit of capacitor 33. Consequently, abrupt changes in the magnitude of the charging source voltage during the charging period would upset the relationship of the voltages of the two capacitors. If such a change in the relationship of the two voltages immediately precedes initiation of a counting operation, an inaccurate count will result. Such a change in the relationship of the two voltages is prevented by capacitor 35, which up until the initiation of a counting operation is connected to provide a charging circuit in which it and capacitor 34 are connected in series relationship directly across the charging source and therefore in parallel with capacitor 33. Capacitors 34 and 35 are designed to have capacitances which are inversely proportional to their steady state voltages. For example, if the steady state voltage of capacitor 34 is one-third the voltage of the charge source, the voltage of capacitor 35 will be two-thirds the voltage of the source. For such a relationship, capacitor 34 will have twice the capacitance of capacitor 35. For example, capacitor 34 might have a capacitance of 1 mfd. and capacitor 35 would have a capacitance of .5 mfd. As a result of this relationship, capacitors 34 and 35 are charged or discharged by a common current during abrupt changes in source voltage during the standby period. Consequently, the voltage of terminal 34a is stabilized at a fixed percentage of the sum of the voltages across both capacitors which sum, during standby, is equal to the voltage of capacitor 33.

From the foregoing, it is seen that a readjustment of the standby voltages of capacitors 34 and 35 is instantaneous with respect to a change in the voltage of capacitor 33 because capacitors 34 and 35 have a common readjustment current that does not flow through the slider of the calibration rheostat 38. Thus capacitor 35 has the important function of maintaining the proper voltage relationship of the voltages of capacitors 33 and 34 during an abrupt change of supply voltage. Theoretically, the slider of the calibration rheostat does not carry any current except when its setting is being changed. A capacitor 44 connected in parallel with the calibration rheostat 38 and the resistor 36 which is connected in the anode circuit of valve 37 cooperate to stabilize the voltage across rheostat 38 and thereby eliminate the effect of any difference in the time of operation of the two normally closed contacts 43b and 43c.

During the counting, the amount of charge removed from capacitor 33 each time that valve 20 conducts depends upon the time that the control electrode of valve 40 is positive during the half cycle of valve 20 conduction. The control electrode bias on valve 40 is indicated as being minus 30 volts, whereas the positive control electrode voltage supplied by valve 20, when it conducts is a very substantial value e. g. 190 volts crest. This is illustrated in Fig. 2 by the sinusoidal voltage curves provided with appropriate legends.

The time during which the cathode 20b is positive with respect to ground would be consistent from cycle to cycle, except that even with valve 20 being allowed to start conducting only during the first 30 degrees of its positive anode voltage, valve 20 may start at different random points within this 30 degree interval depending on valve characteristic, anode supply voltage higher or lower than normal and other conditions. To overcome the effect of non-uniform starting of conduction in valve 20 from cycle to cycle, a diode rectifier 46 and a phase-shift circuit are employed. This static phase-shift circuit comprise a resistor 47 and a capacitor 48 connected in series relationship with each other across the alternating voltage supply conductors 5 and 6. As shown, the anode of the diode 46 is connected to the control electrode 40c and the cathode is connected to the common terminal 47a of the resistor 47 and capacitor 48. Thus, as illustrated by the waveform sketch of Fig. 2, the diode 46 and static phase-shift circuit prevent the voltage of control electrode 40c from becoming positive until after the 30 degree interval within which valve 20 may start conducting. Consequently, diode valve 46 marks the variations in the starting of conduction in the valve 20 and prevents them from affecting the conducting periods of valve 40.

In the standby condition prior to initiation of the control sequence, all of the electric valves 3, 4, 20, 25, 26 and 41 are biased below cutoff and are therefore not conducting as explained in the foregoing. Consequently, the firing circuit transformers 1 and 2 and control transformers 42, 49 and 50 of which the primary windings are connected in the anode circuits of these valves, are deenergized and no welding current is being supplied from the welding transformer to the work.

In Fig. 3, the area beneath the horizontal 0—0 axis represents the condition of non-conduction of valves 3 and 4, and the area above the axis represents the condition of conduction.

The sequence of operation is initiated by closing the initiating switch 51. This instant in time is represented by the position of the arrow 51a on 0—0 axis. As a result, the control electrode 25c of sequence initiating valve 25 is connected through capacitor 53 to the supply voltage terminal 52, of which the voltage is positive with respect to ground by a substantial amount, e. g.

30 volts. Since capacitor 53 cannot charge instantaneously, the voltage of control electrode 25c immediately attains the value of the voltage of supply conductor 52, i. e. 20 volts positive with respect to ground. Valve 25 becomes conducting, and the operating coil 27 of the solenoid valve and the relay coil 43a of the control relay are energized. The conducting circuit of the valve is traced from supply line 6 through operating solenoid 27 and relay coil 43a in parallel, rectifier 29 and the anode-cathode conducting path of valve 25 to ground. This operation is indicated by the arrow 25d in Fig. 3, and the instant in time is represented by the position of this arrow on the 0—0 axis. Energization of the solenoid valve results in the admission of pressure fluid to an operating cylinder (not shown) which causes the welding electrodes to be moved into forcible engagement with the pieces to be welded. After the initiating switch 51 has been closed, the application of welding current must be delayed until the electrodes have been forced into contact with the work. This delay is known as the "squeeze" time and is represented graphically in Fig. 3 as the interval between vertical lines 54 and 55. At the same time, the transformer 50 is energized, since its primary winding 50a also is connected in the anode-cathode conducting path of valve 25.

The voltage which is induced in its secondary winding 50b charges the capacitor 53 positive at its right hand terminal which is connected to control electrode 25c of the initiating valve. The charging circuit for the capacitor extends from one terminal of the secondary winding 50b through diode valve 56, and through resistor 57 to the opposite terminal of the secondary winding. The resulting voltage drop across a resistor 58 which is connected in parallel with capacitor 53 and resistor 57 maintains the control electrode 25c positive and thus provides a sealing in circuit for the valve 25, the operating coil 27 and relay coil 43a. Consequently, the initiating switch 51 may be released, and the sequence continues automatically. Optionally, the initiating switch 51 may be maintained closed for the purpose of initiating a second sequence of operations immediately after the first one terminates. As a result of the simultaneous energization of relay coil 43a, contacts 43b and 43c are opened to interrupt the charging circuits for capacitors 33, 34 and 35 of the counting circuit.

Until this instant, the squeeze time capacitor 24 has been charging through a circuit which is traced from supply conductor 6, through primary winding 50a and operating coils 27 and 43a in parallel, diode valve 59, capacitor 24, and diode valve 60 to grounded conductor 7. Thus it will be noted that prior to the initiation of conduction of valve 25, the voltage of control electrode 20c of initiating valve 20 which is connected to the negative terminal of squeeze capacitor 24 was so negative that the valve 20 was prevented from conducting. However, conduction of valve 25, for all practical purposes, results in connecting the positive terminal of the squeeze capacitor 24 to the grounded conductor 7 thereby to remove the charging voltage and to initiate discharge of the capacitor through the adjustable squeeze time resistor 62 which discharge is represented in Fig. 3 by the portion of curve 24a between its horizontal portion and the 0—0 axis. At the end of the discharge period, which is determined by the adjustment of resistor 62, the voltage of the control electrode 20c of initiating valve 20 becomes sufficiently positive to cause the valve to conduct in the next succeeding positive half cycle of its anode voltage. The instant of the beginning of conduction of valve 20 is represented in Fig. 3 by the arrow 20. As a result of the conduction of valve 20, the heat timing capacitor 11 is charged positive at its terminal 11a and the other heat timing capacitor 12 of the double capacitor timing circuit is charged positive at its terminal 12a. These charges are illustrated in Fig. 3 by the ordinates 11b and 12b of curves 11c and 12c respectively.

The positive voltage at terminal 12a is applied to the control electrode 3c of the leading heat timing valve 3 which becomes conducting and energizes the primary winding 1b of control transformer 1. Conduction by valve 3 is indicated by the arrow 3e in Fig. 3. The firing of valve 3 marks the end of the squeeze time and the beginning of the first heat period.

The voltage which is induced in the secondary winding 1d charges the cool time capacitor 63 through diode valve 64 which is poled so that the charge on the capacitor is negative at the terminal 63a as represented in Fig. 3 by curve 63b. This results in terminating conduction in valve 20 at the end of its first half cycle of conduction, since its control electrode 20c is connected through double diode valve 23 to the negative terminal 63a of the capacitor. This termination of conduction of valve 20 is indicated in Fig. 3 by the arrow 20e. As a result of application of negative voltage to the control electrode 20c, valve 20 is prevented from being fired again immediately following the beginning of the heat period and is thus prevented from initiating a new heat period during the one already in progress. Thus, false timing of the heat period is prevented.

When valve 20 fired, a positive pulse of voltage was supplied to the control electrode 40c of valve 40 which rendered the latter valve conducting for the same half cycle of voltage during which valve 20 conducted.

Up until the initiation of conduction of valve 40, the voltage of the counting capacitor 33 was maintained substantially at full value as represented in Fig. 3 by the horizontal line 33a. In conducting, valve 40 removes from capacitor 33 a portion of its charge, the amount of which is determined by the setting of the number of applications rheostat 39. The amount of charge removed from capacitor 33 is represented by the first vertical portion of the curve 33a between the points 33b and 33c. In this case, the setting is assumed to be made for two applications of welding current. Consequently, the amount of charge removed from capacitor 33 in response to the first application of welding current is insufficient to reduce the voltage of cathode 41b to the value at which valve 41 is rendered conducting.

As a result of termination of conduction in valve 20 at the end of its first half cycle of conduction, capacitor 12 begins to discharge through adjustable resistor 16 into capacitor 11, and the voltage on the control electrode 3c of the leading timing valve 3 begins to decrease in accordance with the discharge curve 12c of capacitor 12 as illustrated in Fig. 3. Each half cycle of conduction of valve 3 causes a pulse of voltage to be induced in the secondary winding 1a, which fires the leading main ignitron valve (not shown) and also causes the voltage to be induced in the secondary winding 1c which fires the trailing timing valve 4 on the next positive half cycle of its anode voltage. The initiation of conduction by valve 4 is indicated by the arrow 4e in Fig. 3. Conduction by the trailing timing valve induces the voltage in the secondary winding 2a of transformer 2 which fires the trailing ignitron in the same half cycle in supply voltage.

Thus, while the capacitor 12 is discharging into capacitor 11 in accordance with curve 12c, the valves 3 and 4 conduct in alternate half cycles of line voltage and cause the main ignitrons to conduct and furnish welding current pulses to welding electrodes in each half cycle in which either valve 3 or valve 4 conducts.

As the heat timing capacitor 12 continues to discharge into the capacitor 11 the heat period approaches termination in accordance with the discharge curve 12c. At the instant which is determined by the intersection of curve 12c with the 0—0 axis, valve 3 becomes non-conducting and valve 4 also does not conduct in the immediately following half cycle of line voltage. This instant marks the end of the first heat period and the beginning of the intervening cool period, preparatory to initiating a second heat period. Termination of conduction in valves 3 and 4 is indicated in Fig. 3 by the arrows 3f and 4f.

With the termination of conduction of valve 3, the cool time capacitor 63 receives no further charging voltage from the secondary winding 1d of transformer 1 and accordingly it begins to discharge in accordance with curve 63b. Included in its discharge circuit is an adjustable resistor 65 and a fixed resistor 66. At the end of a predetermined interval of time which is determined by the setting of the slider of adjustable resistor 65, the voltage at the negative terminal of the capacitor 63 rises to the value at which the voltage of the control electrode 20c which is connected thereto causes valve 20 to become conducting to initiate a new heat period. This is indicated in Fig. 3 by the arrow 20f. This instant of time which is represented by the position of the arrow 20f marks the end of the cool period and the beginning of the second heat period.

As a result of the second period of conduction in valve 20 the heat timing capacitors 11 and 12 are recharged and initiate a new heat period in which the timing valves 3 and 4 again fire in leading and trailing relationship to cause the main ignitron valves also to fire in leading and trailing relationship to supply welding current to the material which is being welded. The recharging of the timing capacitors 11 and 12 is represented in Fig. 3 by the maximum ordinates of the curves 11d and 12d.

Simultaneously with the charging of the capacitors 11 and 12, the second conduction of valve 20 initiates a second period of conduction of valve 40 which removes a second amount of charge from the capacitor 33. The amount so removed is represented by the second vertical portion of the curve 33a between the points 33d and 33e. Assuming the number of applications rheostat 39 to have been set for two applications of welding current in a single spot weld i. e. two heat periods separated from each other by an intervening cool period, the second conduction of valves 20 and 40 reduces the charge on capacitor 33 to the point at which voltage of the cathode of valve 41 becomes sufficiently less positive or more negative with respect to the voltage of control electrode 41c to initiate conduction in the valve 41. In Fig. 3, this relationship of the counting capacitor voltage to the reference voltage is indicated by substantial equality of the ordinate of point 33e of the counting voltage curve and the ordinate of the reference voltage curve 34a. During this second heat period in which valve 3 continues to fire in positive half cycles of its anode voltage an alternating voltage is supplied to the anode and cathode of valve 41 from the secondary 1e of the transformer 1 of which the primary winding is connected in the anode circuit of valve 3. During each half cycle of conduction of valve 41, a charging voltage is supplied to the "hold" timing capacitor 67 from the secondary winding 42b of the transformer 42 of which the primary winding 42a is connected in the anode circuit of valve 41. In Fig. 3, the firing of valve 41 is represented by the arrow 41d and the charge on the hold time capacitor 67 is represented by the curve 67b.

At the end of the second heat period which is determined by the timing capacitors 11 and 12 and which is represented by the intersection of curve 12d with the horizontal 0—0 axis in Fig. 3, valve 3 ceases conduction. Since this terminates the supply of voltage impulses to valve 41, the latter ceases to conduct as indicated by arrow 41e and therefore ceases to maintain the hold timing capacitor 67 fully charged. Consequently, it begins to discharge at a rate which is determined by the setting of the slider of the hold timer rheostat 31. Its discharge is represented by the sloping portion of the curve 67b between the points 67c and 67d. Also at the end of the second heat period, the cool time capacitor 63 is fully charged i. e. negative at its control electrode terminal, as it was at the end of its first heat period, so that the valve 20 cannot immediately be rendered conducting to initiate a new heat period.

In response to the charge on the hold time capacitor 67 of which the positive terminal is connected to the control electrode 26c the valve 26 is rendered conducting. Since the primary winding 49a of control transformer 49 is connected in the anode circuit of valve 26, conduction in this valve causes to be induced in the secondary winding 49b a voltage which is supplied through diode valve 68 to the terminals of the "off" timing capacitor 69. This voltage is negative at the terminal 69a, and is represented in Fig. 3 by the ordinate of the horizontal portion of broken line curve 69b.

Between the negative terminal 69a of "off" capacitor 69 and control electrode 25c of valve 25 is connected a diode electric valve 70 which is poled to conduct if the voltage of control electrode 25c is more positive than the voltage of terminal 69a. Consequently, the voltage of control electrode 25c is immediately reduced to the negative value of the voltage at terminal 69a and valve 25 is rendered non-conducting. However, the termination of conduction in valve 25 does not deenergize either the solenoid valve or the control relay 43 since their operating coils are connected through the diode 30 to the anode circuit of the valve 26 conduction of which is still being maintained by the positive voltage supplied to its control electrode 26c from the terminal 67a of the hold time capacitor 67. Consequently valve 26 maintains the solenoid valve and the relay energized until the end of the hold time, and thus the welding electrodes are maintained forced against the work during the hold period which immediately follows the termination of the second heat period.

During this hold period the hold time capacitor 67 is discharging in accordance with the portion of the curve between the points 67c and 67d. At the end of the period which is indicated in Fig. 3 by the intersection of this portion of the curve with the horizontal 0—0 axis the voltage at terminal 67a of the hold capacitor has decreased to a value at which conduction is no longer initiated in positive half cycles of the anode voltage of valve 26 and consequently the valve ceases to conduct.

At the end of the hold time, termination of conduction in valve 26 deenergizes the solenoid valve and also the relay 43. Deenergization of the solenoid valve releases the pressure on the electrodes and permits them to be separated from the work. Responsively to deenergization of its operating coil and relay 43 recloses its normally closed contacts 43b and 43c thereby to restore the charging connections of the capacitor 33 and to recharge it to its fully charged value as indicated in Fig. 3 by the vertical portion of the curve 33a between the points 33f and 33g. Also it initiates the "off" time period by ceasing to charge the "off" time capacitor through transformer 49. In response to the termination of supply charging voltage, "off" time capacitor 69 discharges in accordance with the portion of the curve 69b between the points 69c and 69d. During this discharge, the voltage of the control electrode 25c of the sequence initiating valve 25 is maintained more negative than the cutoff value, and consequently, during the discharge, valve 25 cannot be fired to initiate a new sequence even though the initiating switch should be closed.

However, at the end of a predetermined interval of time, after the initiation of its discharge, off capacitor 69 discharges to the point at which the voltage, which is supplied to the control electrode 25c of electric valve 25, may exceed the critical firing value of initiating switch is closed. This causes the valve 25 to fire, as indicated in Fig. 3 by the arrow 25f, to initiate the squeeze period of a new welding cycle.

Although in accordance with the provisions of the patent statutes, this invention is described as embodied in concrete form, and its principle has been explained, together with the best mode in which it is now contemplated applying that principle, it will be understood that the invention is not limited to the specific apparatus shown and described, since alterations and modifications will readily suggest themselves to persons skilled in the art without departing from the true spirit of the invention or from scope of the annexed claims.

What I claim as new and desire to secure by Letters Patent of the United States is:

1. A counting circuit comprising a pair of capacitors, an electrical connection from a first terminal of one of said capacitors to a first terminal of the other, means for charging said capacitors to different voltages having a predetermined relationship, a first electric valve having an output circuit connected across a first of said capacitors and an input circuit, means for producing and supplying to said input circuit a succession of voltage impulses each having a predetermined duration for rendering said valve conducting for a predetermined interval to remove a predetermined amount of charge from said first capacitor in response to each of said pulses, a control circuit and means for rendering said control circuit active in response to a predetermined relationship of the voltages of said capacitor comprising a second electric valve having an anode, a control electrode connected to the second terminal of one of said capacitors, a cathode connected to the second terminal of the other and having its anode-cathode conducting path included in said control circuit.

2. A counting circuit comprising first and second capacitors each having a first terminal connected to a corresponding first terminal of the other and each having a second terminal, means for charging one of said capacitors with a reference voltage of predetermined value and for charging the second of said capacitors with a voltage having a predetermined relationship to said reference voltage, an electric valve having an output circuit connected across the terminals of said second capacitor and an input circuit, means for producing and supplying to said input circuit a succession of voltage impulses of substantially equal duration thereby to render said valve conducting to remove from said second capacitor a predetermined fraction of its charge in response to each of said impulses, a control circuit and means rendering said control circuit active to initiate a controlling function after a predetermined number of said voltage impulses comprising a second electric valve having an anode, a cathode connected to said second terminal of one of said capacitors, a control electrode connected to said second terminal of the other and having its anode-cathode conducting path including in said control circuit.

3. A counting circuit comprising first and second capacitors having a common terminal and each having a second terminal remote therefrom, means for charging said capacitors to different voltages having a predetermined relationship to each other, a first electric valve having an output circuit connected across the first of said capacitors and an input circuit, means comprising alternating voltage supply conductors and a second electric valve supplied therefrom for producing and supplying to said input circuit a succession of voltage impulses of substantially uniform duration for rendering said first valve conducting in response to each of said impulses, a phase shift network supplied from said conductors and connected to said input circuit for limiting the conduction periods of said first valve to equal periods each terminating at the end of a positive half cycle of the voltage of said supply conductors thereby to remove from said first capacitor a predetermined portion of its charge in response to each of said impulses, a control circuit and means for rendering said control circuit active to initiate a control operation at the end of a predetermined number of said voltage impulses comprising a third electric valve having an anode, a cathode connected to said remote terminal of one of said capacitors, a control electrode connected to said remote terminal of the other said capacitors and having its anode-cathode conducting path included in said control circuit.

4. A counting circuit comprising first and second capacitors having a common terminal and each having a second terminal remote from said common terminal, means for charging one of said capacitors with a reference voltage of predetermined value and for charging the second of said capacitors to a different predetermined value, first electric valve having an output circuit connected across the terminals of said second capacitor and an input circuit, means for producing and supplying to said input circuit a succession of voltage impulses of substantially equal duration to render said valve conducting to remove from said second capacitor a predetermined portion of its charge in response to each of said impulses an adjustable resistor connected in said output circuit for determining the number of conductions of said valve required to establish a predetermined relationship of the voltage of said capacitors, a control circuit and means for rendering said control circuit active to initiate a controlling operation after a predetermined number of said voltage impulses and in response to the establishment of said predetermined voltage relationship comprising a second electric valve having an anode, a cathode connected to said remote terminal of said second capacitor, a control electrode connected to said remote terminal of said first capacitor and having its anode-cathode conducting path included in said control circuit.

5. A counting circuit comprising first and second capacitors having a common negative terminal and each having a separate positive terminal, means for charging said first capacitor with a reference voltage and for charging said second capacitor with a voltage having a predetermined value substantially greater than said reference voltage, a first electric valve having an output circuit connected across the terminals of said second capacitor and an input circuit, means for producing and supplying to said input circuit a succession of voltage impulses of substantially equal duration thereby to render said valve conducting to remove from said second capacitor a predetermined portion of its charge in response to each of said impulses, a control circuit and means for rendering said control circuit active to initiate a control operation after a predetermined number of said voltage impulses and in response to substantially zero difference between said reference voltage and the voltage of said second capacitor comprising a second electric valve having an anode, a cathode connected to the positive terminal of said second capacitor, a control electrode connected to the positive terminal of said first capacitor and having its anode-cathode conducting path included in said control circuit.

6. A counting circuit comprising a pair of charging voltage supply conductors, a calibrating rheostat connected across said conductors and provided with a sliding contact, a first capacitor having its terminals directly connected to said supply conductors, a second capacitor having one terminal connected to a first of said supply conductors and having its other terminal connected to said sliding contact to affect a predetermined relationship between the voltages to which said capacitors are charged, means for maintaining said predetermined relationship at all times when said capacitors are connected to said conductors for charging a third capacitor connected between said sliding contact and the second of said supply conductors and having a predetermined capacity relationship to the capacity of said second capacitor, a first electric valve having an output circuit connected across said first capacitor and having an input circuit, a control device, means responsive to operation of said control device for interrupting the charging connections of said capacitors, means responsive to said operation of said device for producing and supplying to said input circuit a succession of voltage impulses each having a predetermined duration for rendering said valve conducting for predetermined intervals to remove a predetermined amount of charge from said first capacitor in response to each of said impulses, a control circuit and means for rendering said circuit active to initiate a control operation in response to a predetermined relationship of the voltages of said first and second capacitors comprising a second electric valve having an anode, a control electrode connected to a terminal of said second capacitor a cathode connected to a terminal of said second capacitor and having its anode-cathode conducting path included in said control circuit.

7. A counting circuit comprising a pair of charging voltage supply conductors, a calibrating rheostat connected across said conductors and provided with a sliding contact, first and second capacitors having a common terminal connected to one of said supply conductors and each having a second terminal remote therefrom, a connection from said remote terminal of said first capacitor to the other of said supply conductors, a connection from said remote terminal of said second capacitor to said sliding contact to cause said second capacitor to be charged to a voltage having a predetermined ratio to the voltage of said first capacitor, means for maintaining said ratio constant at all times when said capacitors are connected to said conductors for charging comprising a third capacitor connected between said sliding contact and said other conductor and having a capacity of which the ratio to the capacity of said second capacitor is inverse to the ratio of their charging voltages, a first electric valve having an output circuit connected across said first capacitor and an input circuit, a control device, means responsive to operation of said control device for interrupting the charging connections of said capacitors, means responsive to said operation of said device for producing and supplying to said input circuit a succession of voltage impulses of substantially equal duration to render said valve conducting to remove from said first capacitor a predetermined portion of its charge in response to each of said impulses, a control circuit and means for rendering said circuit active to initiate a control operation in response to a predetermined relationship of the voltages of said first and second capacitors comprising a second electric valve having an anode, a control electrode connected to the remote terminal of said second capacitor and having its anode-cathode conducting path included in series in said control circuit.

8. A counting circuit comprising a pair of charging voltage supply conductors, a calibrating rheostat connected across said conductors and provided with a sliding contact, first and second capacitors having a common terminal connected to one of said supply conductors and each having a second terminal remote therefrom a connection from said remote terminal of said first capacitor to the other of said supply conductors, a connection from said remote terminal of said second capacitor to said sliding contact to cause said second capacitor to be charged to a voltage having a predetermined ratio to the voltage of said first capacitor, means for maintaining said ratio constant at all times when said capacitors are connected to said conductors for charging comprising a third capacitor connected between said sliding contact and said other conductor and having a capacity of which the ratio to the capacity of said second capacitor is inverse to the ratio of their charging voltage, a first electric valve having an output circuit connected across said first capacitor and an input circuit, a pair of alternating voltage supply conductors, a control device, means responsive to operation of said control device for interrupting the charging connections of said capacitors, means comprising a second electric valve supplied from said alternating voltage supply conductors and responsive to said operation of said control device for producing and supplying to said input circuit a succession of voltage impulses of substantially uniform duration for rendering said first valve conducting to remove a predetermined portion of the charge of said first capacitor in response to each of said impulses, a control circuit and means for rendering said circuit active in response to a predetermined relationship of the voltages of said first and second capacitors comprising a third electric valve having an anode, a control electrode connected to said remote terminal of said second capacitor, a cathode connected to said remote terminal of said first capacitor and having its anode-cathode conducting path included in said control circuit.

9. A counting circuit comprising positive and negative charging voltage supply conductor, a calibrating rheostat connected across said conductors and provided with a sliding contact first and second capacitors each having a terminal connected to said negative conductor and each having a second terminal remote therefrom, a connection from said remote terminal of said first capacitor to said positive supply conductor, a connection from said remote terminal of said second capacitor to said sliding contact to cause said second capacitor to be charged to a voltage having a predetermined ratio to the voltage of said first capacitor, means for maintaining said ratio constant during the charging of said capacitors comprising a third capacitor connected between said sliding contact and said positive supply conductor and having a capacity of which the ratio to the capacity of said second capacitor is in inverse proportion to their charging voltages, a first electric valve having an output circuit connected across said first capacitor and having an input circuit, a control device means responsive to operation of said control device for interrupting the charging connections of said capacitors, means responsive to said operation of said control device for producing and supplying to said input circuit a succession of voltage impulses of substantially uniform duration thereby to render said valve conducting to remove from said first capacitor a predetermined portion of its charge in response to each of said impulses, a control circuit and means for rendering said circuit active to initiate a control operation after a predetermined number of said voltage impulses comprising a second electric valve having an anode, a cathode connected to said remote terminal of one of said capacitors, a control electrode connected to said remote terminal of the other and having its anode-cathode conducting path included in said circuit.

10. A counting circuit comprising positive and negative charging voltage supply conductor, a calibrating rheostat connected across said conductors and provided with a sliding contact first and second capacitors each having a terminal connected to said negative conductor and each having a second terminal remote therefrom, a connection from said remote terminal of said first capacitor to said positive supply conductor, a connection from said remote terminal of said second capacitor to said sliding contact to cause said second capacitor to be charged to a voltage having a predetermined ratio to the voltage of said first capacitor, means for maintaining said ratio constant during the charging of said capacitors comprising a third capacitor connected between said sliding contact and said positive supply conductor and having a capacity of which the ratio to the capacity of said second capacitor is in inverse proportion to their charging voltages, a first electric valve having an output circuit connected across said first capacitor and having an input circuit, a pair of alternating voltage supply conductors, means responsive to operation of said control device for interrupting the charging connections of said capacitors, means comprising a second electric valve connected to be responsive to said operation of said control device for producing and supplying to said input circuit a succession of voltage impulses of substantially uniform duration for rendering said first valve conducting in response to each of said impulses, a phase shift network supplied from said alternating voltage supply conductors and connected to said input circuit for limiting the conduction periods of said first valve to equal periods each terminating at the end of a positive half cycle of its anode voltage thereby to remove from said first capacitor a predetermined portion of its charge in response to each of said impulses, a control circuit and means for rendering said circuit active to initiate a control operation at the end of a predetermined number of said voltage impulses comprising a third electric valve having an anode, a cathode connected to said remote terminal of said first capacitor, a control electrode connected to said remote terminal of said second capacitor and having its anode-cathode conducting path included in said control circuit.

No references cited.